Oct. 17, 1950      M. C. CARBONARO      2,526,117
VARIABLE RATIO TRANSMISSION

Filed Feb. 25, 1948      4 Sheets-Sheet 1

Inventor
M. C. Carbonaro
By
Wenderoth, Lind & Ponack
Attorneys

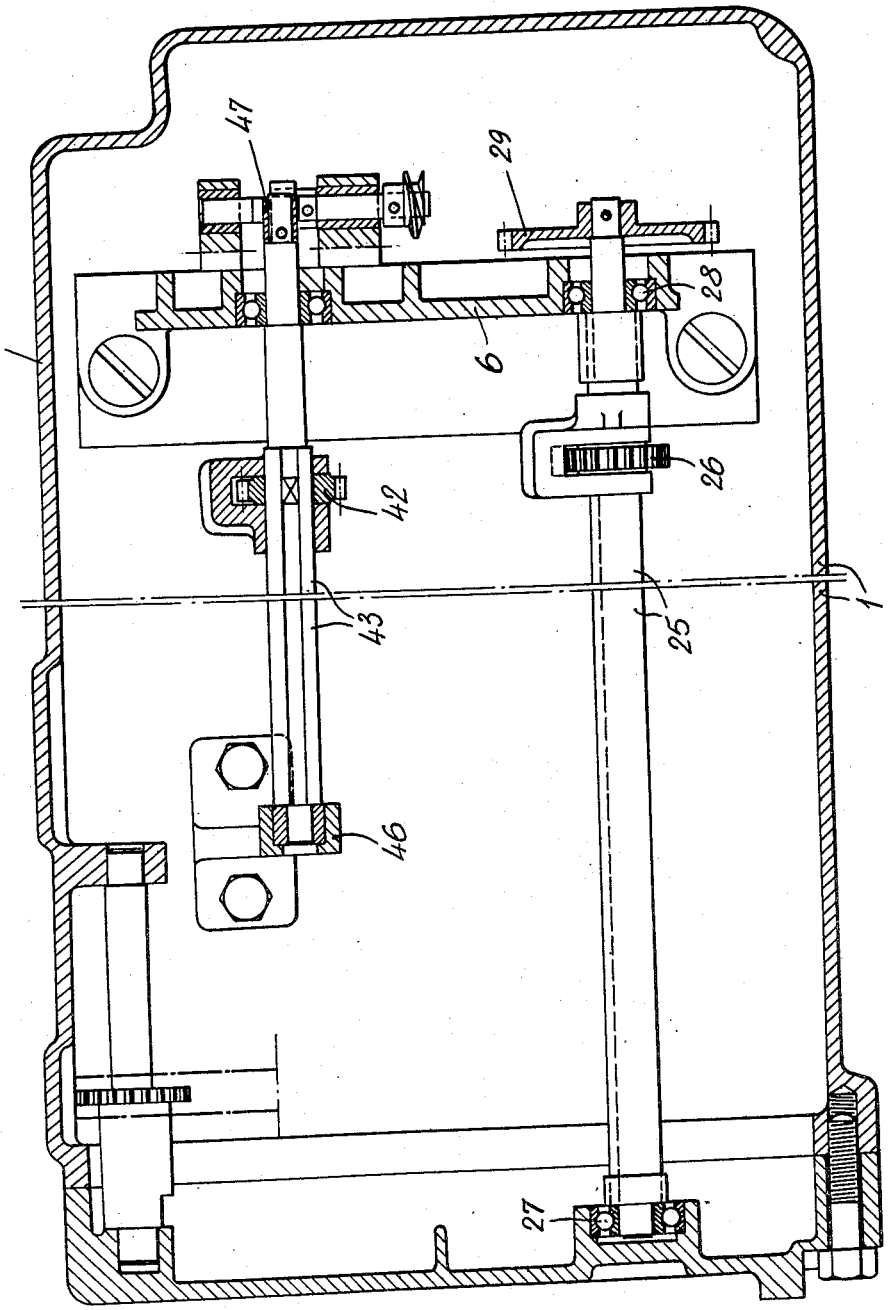

Patented Oct. 17, 1950

2,526,117

UNITED STATES PATENT OFFICE 2,526,117

VARIABLE RATIO TRANSMISSION

Marius Clement Carbonaro, Paris, France, assignor to Satam Societe Anonyme Pour Tous Appareillages Mecaniques, Seine, France, a society of France Application February 25, 1948, Serial No. 10,817
In France February 16, 1938

4 Claims. (Cl. 74—681)

This application is a continuation in part of my abandoned application Serial No. 256,159 filed February 13, 1939 entitled "Apparatus for distributing liquids or gases."

When it is desired to transmit with a predetermined ratio expressed as a number of three digits, the first idea entering the mind would be to transmit separately each of the three digits and to add up the results obtained through three such elementary transmissions.

The present invention has for its object to reduce the number of elementary transmissions to two; it consists accordingly in transmitting through a first elementary transmission a first ratio expressed by a two digit number of which the unit digit is equal to the unit digit in the desired transmission ratio and the tens digit to a predetermined number and to transmit through a second elementary transmission a second elementary ratio expressed as a number of two digits equal to the number formed by the hundreds digit and the tens digit of the total transmission ratio to be transmitted after deduction of the predetermined digit above-mentioned after which the partial ratios obtained are added, the second number being multiplied by ten.

If this method is applied to transmissions constituted by a conical stack of pinions located alongside one another associated with sliding pinions, each of which latter cooperates with a pinion of the stack defined by the ratio to be transmitted by the sliding pinion considered and drives a partial transmission, and with an arrangement adding the results of each of the partial transmissions, said present method allows in the case where the hundreds digit varies but little, and may assume for instance only the values 2, 3 and 4, obtaining the desired results with a stack of adjacent pinions that are comparatively few and form a cone with a comparatively small angle at its apex.

Preferably, the sliding pinions are carried by a strap sliding over a shaft parallel with the axis of the stack of pinions and are controlled by a projection rigid with a nut screwed over a threaded rod, the geometrical axis of which is parallel to its axis of rotation but is shifted with reference thereto and is parallel with a generating line of the cone enclosing the stack of pinions, the pitch of the thread of said rod corresponding to the distance between two successive pinions of the stack.

The present invention covers also various constructional details to be described hereafter.

By way of example, accompanying drawings illustrate a preferred embodiment of the invention:

Figs. 1A, 1B and 2 are two cross-sections of the transmission gear-box through lines I—I and II—II of Fig. 4.

Figure 1A:
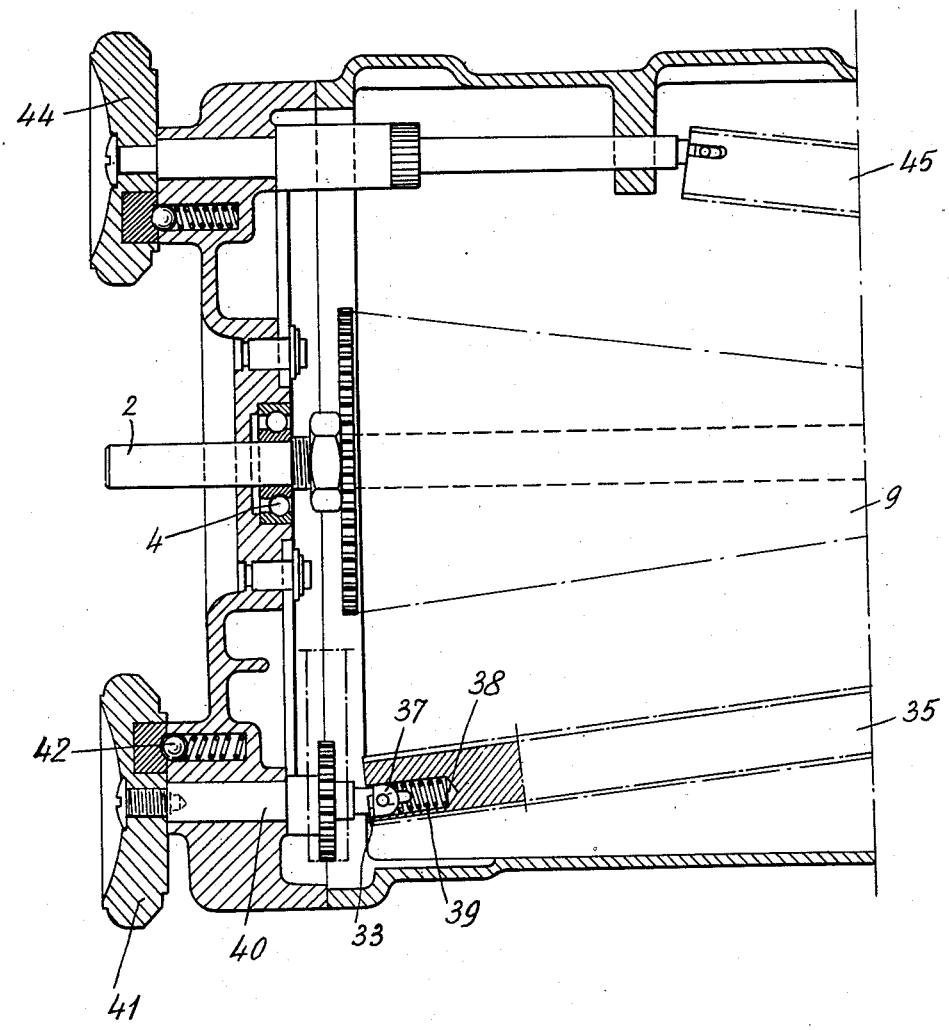
Figure 1B:
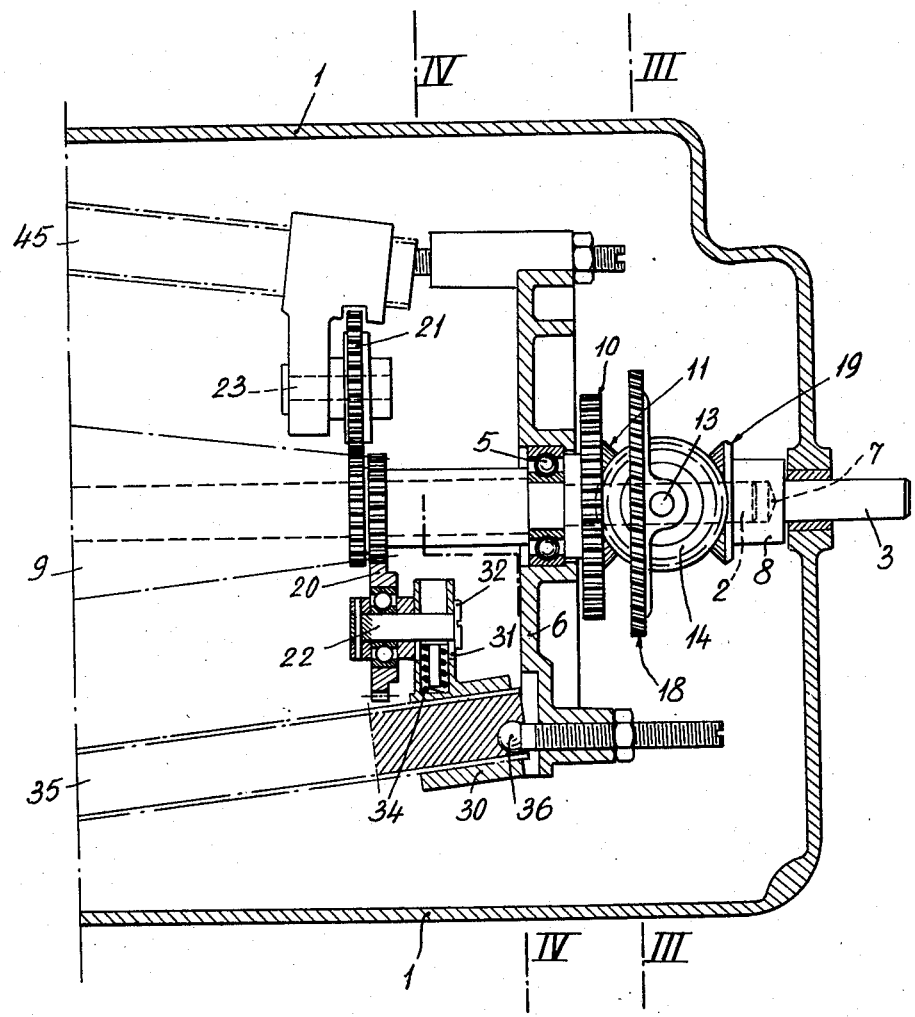

The speed-modifying box illustrated is carried in a casing 1. The driving shaft 2 enters said casing 1 through one side while the driven shaft 3 passes out of it on the opposite side. The driving shaft 2 rests through the agency of ball bearings 4 and 5 on the side of the casing 1 through which it enters same and on the partition or support 6 rigid with the bottom of the casing 1. Its inner end engages a recess 7 provided in the expansion 8 at the end of the driven shaft 3 and serving as an abutment for the latter with reference to the side wall of the box 1 through which the driven shaft 3 passes.

The driving shaft 2 carries a conical set of pinions 9 keyed to it. The pinions that may be say thirty in number have the same pitch, but the number of their teeth varies in accordance with an arithmetic ratio, say as between 19 and 58.

On the part of the driving shaft 2, comprised between the support 6 and the side of the casing 1 through which the driven shaft 3 passes, are mounted loosely a first toothed wheel 10, of say 42 teeth, that is fixed to a bevel pinion 11 and the hub 12 of a toothed wheel 18 of say 40 teeth.

Figure 3:
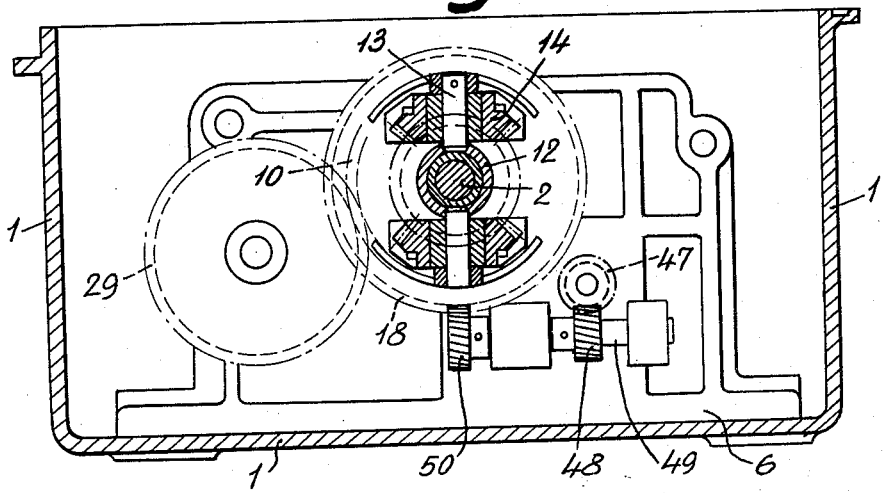
Figs. 3 and 4 are two cross-sections of the same gear-box through lines III—III and IV—IV of Fig. 1B.
Figure 4:
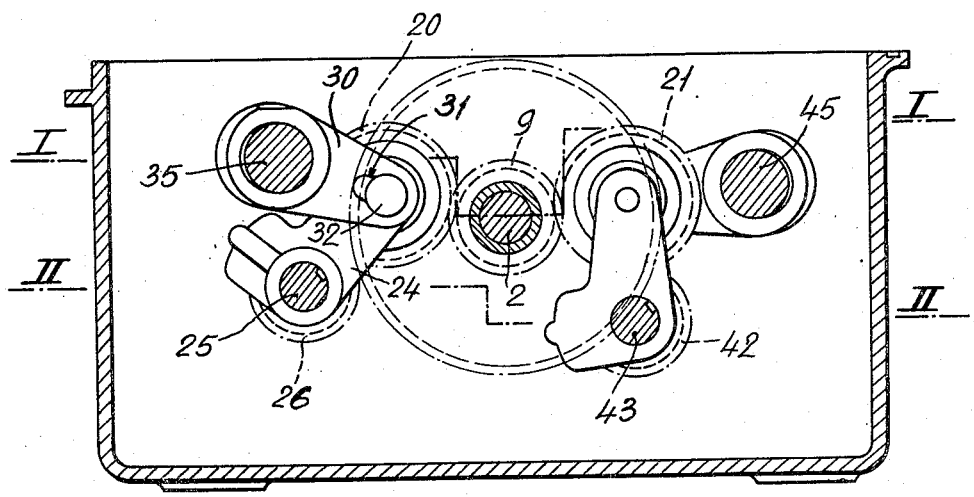

The last-mentioned wheel 18 carries on one of its sides two axes 13 round which may freely rotate two bevel pinions 14 (Fig. 3). These pinions 14 mesh on one hand with the bevel pinion 11 and on the other hand with the bevel pinion 19 rigid with the expansion 8 on the driven part 3. The bevel pinions 14, 11 and 19 form a differential gear of which the wheel 18 forms the planet carrier.

The conical set of pinions 9 cooperates with two sliding pinions 20 and 21 both of which have say 20 teeth and the axes 22 and 23 of which are parallel with the driving shaft 2.

The spindle 22 is pinned to a strap 24, which latter is mounted loose on a shaft 25 parallel with the shaft 2 whereby said spindle 22 is adapted to describe an arc of a circle round the shaft 25. At the same time, the pinion 20 meshes with a pinion 26 slidingly secured to the shaft 25 and moving with said strap so that the rotation of the pinion 20 produces the rotation of the pinion 26 and that of the shaft 25. The latter rests on one hand on one of the sides of the gear box 1 and on the other hand on the support 6 through the agency of the corresponding ball bearings 27 and 28. The end of the shaft 25 projecting beyond the partitioning support 6 and registering with the wheel 10 carries, rigidly secured thereto, a toothed pinion 29 of say 42 teeth meshing with said wheel 10. The pinion 20 may be shifted along the stack 9 through the agency of a projection 30 provided with a gate 31 carrying the spindle 22. The head 32 of the spindle 22 urges the strap 24 tightly against the projection 30. A spring 34 urges, through the agency of the spindle 22 the pinion 20 against the set of pinions 9. This projection 30 forms a nut engaging the threaded rod 35. The latter is carried by two socket joints 36 and 37. The socket joint 36 includes a spherical element rigid with the partitioning support 6 and engages a recess provided at the end of the rod 35. Similarly the socket joint 37 includes a spherical element engaging a recess 38 at the other end of the rod 35. A pin 33 passing through a slot of the rod 35 allows the spherical element 37 to drive said rod 35. A spring 39 bearing against said spherical element 37 allows the positioning of the threaded rod 35. Said spherical element 37 is carried by a shaft 40 projecting to the outside of the gear box casing 1 and carried by the side of the latter. It should be remarked that the line of centers of the spherical elements 36, 37 is laterally shifted with reference to the geometrical axis of the rod 35. This line and this geometrical axis are parallel to one of the generating lines of the cone enveloping the stack of pinions 9. The end of the shaft 40 projecting to the outside of the box carries a controlling handle 41. A catch system 42 allows holding the handle 41 fast after every revolution.

The parts cooperating with the pinion 21 are exactly the same as those described with reference to the pinion 20. The pinion 21 meshes with a pinion 42 of say 20 teeth, that is slidingly carried by the shaft 43 parallel with the shaft 2 and controlled by the handle 44 through the agency of the threaded rod 45. The shaft 43 carried by the partition 6 and a support 46 secured to the bottom of the gear box carries at its end a worm wheel 47 of say 10 teeth cooperating with a further worm wheel 48 of say 10 teeth carried by a shaft 49 carrying in its turn at its end a worm 50 with only one thread for instance, said worm meshing with the worm wheel 18 carrying the planet pinions 14.

When the driving shaft 2 rotates, it carries along with it the stack of pinions 9 and through the pinion 9 that engage the operative pinions 20 and 21 the latter turn. The pinion 20 drives the pinion 26 and through the agency of the shaft 25 the pinion 29. The latter drives in its turn the pinion 10 and the sunwheel 11 of the differential gear 11—14—19. On the other hand the pinion 21 drives through the agency of the pinion 42, of the shaft 43, of the wormwheels 47 and 48; of the shaft 49 of the worm 50 and wormwheel 18, the planet pinions 14 of said differential gear 11—14—19. The pinion 19 drives through the added rotation of the pinion 11 and planet pinions 14 the driven shaft 3.

If it is desired to vary the ratio of the transmission, the handles 41 and 44 are operated for shifting the corresponding sliding pinions 20 and 21 in order to bring the latter in front of further selected pinions 9 in the following manner: for instance a rotation, through one revolution of the handle 41, makes the threaded rod 35 turn through one revolution round the line formed by the rotulas 36—37. By reason of the shifting of the geometrical axis of the rod with reference to said line, the threaded rod 35 draws first towards it the projection 30, which has for its action to shift the spindle 22 and the pinion 20 away from the pinion 9 with which it was meshing, after which the projection 30 is returned towards the stack 9 and the pinion 20 is returned into engagement with the pinion 9 lying then in front of it. As during this rotation, the nut-forming projection 30 has moved through one pitch of the helical thread on the rod 35 that corresponds to the distance between the two successive pinions 9, the pinion 20 will mesh no longer with the pinion 9 with which it was in engagement before the rotation of the handle 41, but with the pinion 9 that is immediately adjacent thereto on the right hand or on the left hand side, according to the direction of rotation of the handle 41. It is therefore necessary to rotate the handle 41 through as many complete rotations as there are pinions 9 over which it is desired to make the pinion 20 rotate. The operation and the results obtained are the same in the case of the handle 44 for the control of the pinion 21.

Supposing the pinion 20 meshes with a pinion 9 of N1 teeth and the pinion 21 with a pinion 9 of N2 teeth, for each complete clockwise revolution of the shaft 2, said direction being assumed to be the positive direction; a rotation of $$-\frac{N1}{20}$$

revolution will be given to the pinion 20, of $$+\frac{N1}{20}$$

to the pinion 26, of $$+\frac{N1}{20}$$

to the pinion 29, of $$-\frac{N1}{20}$$

to the pinion 10 and of $$-\frac{N1}{20}$$

to the sunwheel 11. Similarly for each revolution of the shaft 2, the pinion 21 will rotate through $$-\frac{N2}{20}$$

the pinion 42 through $$+\frac{N2}{20}$$

as well as the worm wheel 47, while the pinion 48 and the threaded rod 50 rotate through $$+\frac{N2}{20}$$

and the wheel 18 through $$+\frac{N2}{20}\times\frac{1}{40}$$

The output sunwheel 19 of the differential gear will execute a rotation of $$-\left(-\frac{N1}{20}\right)+2\times\frac{N2}{800}=\frac{1}{20}\left(N1+\frac{N2}{20}\right)$$

It is thus possible to modify the ratio of the transmission between 1 (for N1=19 and N2=20) and 3 (for N1=58 and N2=40) with modifications by one hundredth at a time. In other words the apparatus allows obtaining two hundred different ratios of which the hundreds digit may be 1 or 2.

What I claim is:

1. A variable ratio transmission for transmitting power comprising a driving shaft, a driven shaft, a series of at least ten gears driven by said driving shaft, the number of teeth in said gears having the relationship of $p$, $p+1$ ... wherein $p$ is an integer greater than one and the number of teeth of the largest gear being less than nine times the number of teeth of the smallest gear of said series, a differential mechanism having three elements including two sun gears and a planetary gear one of its elements being connected to said driven shaft, two threaded control rods each parallel to a generatrix of the cone of the enveloping surface of said series of pinions, a support upon each of said rods formed as a nut upon the corresponding threaded rod, two transmissions each comprising a transmission shaft parallel to the rotation axis of said series of gears, a transmitting gear keyed slidingly upon said last named shaft, a change speed gear carried by said support and adapted to mesh with one or the other of at least the greater number of gears of said series and to mesh in a permanent manner with said transmitting gear, the transmission shaft of the first transmission controlling one of the two elements of the differential not connected to the driven shaft and the transmission shaft of the other transmission controlling the other of these two elements, the ratios of the two transmissions being fixed in such a manner that the number of revolutions of the driven shaft for one revolution of the series of gears when the change speed gear of a single one of the two transmissions is in engagement with one of the gears of the series is equal to ten times the number of revolutions of the driven shaft for one revolution of the series of gears when the other change speed gear of the other transmission is singly in connection with the same gear of the series.

2. A variable ratio transmission for transmitting powers comprising a driving shaft, a driven shaft, a series of at least ten gears driven by said driving shaft, the number of teeth in said gears being in the ratio of the numbers $p$, $p+1$ ..., $p$ being an integer greater than one, and the number of the teeth of the largest gear of said series being less than nine times the number of teeth of the smallest gear of said series, a differential mechanism having three elements including two sun gears and a planetary gear, one of the sun gears thereof being connected to the driven shaft, two transmissions each comprising a threaded control rod parallel to one of the generatrices of the enveloping cone formed by the series of gears, a support forming a nut upon said rod, a change speed gear carried by said support and adapted to mesh with any one or the other of at least the greater number of the gears of said series of gears, a shaft parallel to the axis of rotation of the gears of said series, a sliding pinion keyed slidingly upon said last named shaft and continually in engagement with the change speed gear, the shaft of one of the transmissions controlling the planetary gear of the differential mechanism not connected to the driven shaft, while the shaft of the other transmission gear controls the sun gear of the differential mechanism non-connected to said driven shaft, the ratio of one of said transmissions being equal to twenty times the ratio of the other transmission.

3. A variable ratio transmission in accordance with claim 2, wherein the threaded rod of each transmission is adapted to rotate about an axis eccentric with respect to the geometric axis of said rod.

4. A transmission as set forth in claim 2 wherein two recesses are provided located in each of said threaded rods adjacent the ends thereof, a first spherical element located in one of said recesses, an exterior control element, a second spherical element integral with said control element and located in the other recess, the line of centers of said two spherical elements being parallel to the axis of the threaded rod and being offset with relation to said axis.

MARIUS CLEMENT CARBONARO.

REFERENCES CITED

The following references are of record in the file of this patent:

UNITED STATES PATENTS

| Number | Name | Date |
|---|---|---|
| 338,916 | Bevier | Mar. 30, 1886 |
| 1,471,162 | Iacobacci | Oct. 16, 1923 |
| 1,662,688 | Veber | Mar. 13, 1928 |
| 1,984,039 | Sieg | Dec. 11, 1934 |

FOREIGN PATENTS

| Number | Country | Date |
|---|---|---|
| 238,010 | Great Britain | Aug. 10, 1925 |
| 842,413 | France | Mar. 6, 1939 |